US005342236A

United States Patent [19]

Repisky et al.

[11] Patent Number: 5,342,236

[45] Date of Patent: Aug. 30, 1994

[54] MEAT CUTTER

[75] Inventors: Milan Repisky, Roswell; Anton Tur, Marietta, both of Ga.

[73] Assignee: Milton Industries, Inc., Atlanta, Ga.

[21] Appl. No.: 60,865

[22] Filed: May 12, 1993

[51] Int. Cl.[5] .......... A22C 17/00

[52] U.S. Cl. .......... 452/149; 452/142; 452/162

[58] Field of Search .......... 452/149, 142, 162, 127, 452/148

[56] References Cited

U.S. PATENT DOCUMENTS

| | | | |
|---|---|---|---|
| D. 93,368 | 9/1934 | West | 452/149 |
| 2,163,123 | 6/1939 | Huse | 17/26 |
| 2,241,648 | 5/1941 | Spang | 452/149 |
| 2,291,809 | 8/1942 | Jackson | 452/149 |
| 2,737,684 | 3/1956 | Spang | 452/142 |
| 2,807,055 | 9/1957 | Brown | 452/142 |
| 2,811,743 | 11/1957 | Crabtree, Jr. | 452/142 |
| 3,222,712 | 12/1965 | Deckert | 452/142 |
| 3,222,713 | 12/1965 | Stein et al. | 452/142 |
| 3,716,893 | 2/1973 | Vogelsang | 17/26 |
| 3,786,536 | 1/1974 | Deckert | 17/25 |
| 4,085,482 | 4/1978 | Charron | 17/26 |
| 4,172,400 | 10/1979 | Brierley | 83/500 |
| 4,672,716 | 6/1987 | Dickey | 17/26 |

FOREIGN PATENT DOCUMENTS

| | | | |
|---|---|---|---|
| 478386 | 11/1951 | Canada | 452/142 |

*Primary Examiner*—Willis Little

*Attorney, Agent, or Firm*—Hopkins & Thomas

[57] ABSTRACT

A food cutting machine for cutting food into strips or cubes has first and second rotatable shafts, each having an array of cutter discs thereon. The cutter discs on one shaft are offset from corresponding discs on the other shaft and form cutter pairs therewith, the spacing between pairs being substantially greater than the spacing between the discs forming the pairs. Guide means extending between cutter pairs define the maximum thickness of meat that can be cut, and the discs forming a pair overlap a distance equal to or greater than one-half the spacing between the guide means.

13 Claims, 4 Drawing Sheets

MEAT CUTTER

FIELD OF INVENTION

This invention relates to food processing machines, and, more particularly, to a manually operated meat slicing machine.

BACKGROUND OF THE INVENTION

In the field of large scale, or restaurant scale, processing of food, slicing meat into strips or cubes for use in, for example, fajitas or salads, is a frequent occurrence. Slicing into strips or cubing meat by hand can be a laborious and slow process, and uniformity of the strips or cubes depends upon the skill of the person doing the slicing.

There are, in the prior art, numerous examples of apparatus for slicing meat into strips. In U.S. Pat. No. 3,786,536 of Deckerr, there is shown one such apparatus that simultaneously tenderizes and slices a slab of meat into strips. A plurality of spaced tenderizing blades are mounted on a first shaft and a lesser plurality of spaced slicing blades are mounted on a second shaft closely adjacent and parallel to the first shaft. The slicing blades, which are fewer in number than the tenderizing blades are interleaved therewith. The two shafts are geared together so that the slicing blades revolve faster than the tenderizing blades, and the tenderizing blades penetrate the meat and pull it into the cutting area. Guide fingers are disposed between the tenderizing blades and the slicing blades for guiding the meat into the cutting area. This general arrangement of elements is common to a number of prior art meat tenderizing devices, such as is shown in U.S. Pat. No. 4,672,716 of Dickey, which also includes stripper plates for preventing the meat from wrapping around the rollers. Such wrapping of the meat around the rollers occurs frequently when raw meat is being tenderized or cut. The raw meat being processed becomes a flexible, glutinous mass with a tendency to stick to the blades and to wrap around the shafts after it is cut, which jams up the cutting area, thereby preventing further cutting until the jam is cleared. Thus, the stripper plates of the Dickey patent are useful in preventing such jam-ups from occurring.

In U.S. Pat. No. 2,163,123 of Huse, there is shown a meat tenderizing machine having the general structure of parallel shafts having interleaved cutters geared together to rotate contra to each other to draw the meat into the cutting area. Spring loaded fingers interspersed between the blades function to guide the meat into the cutting area and to prevent the meat from wrapping around the shafts. Inasmuch as the Huse arrangement does not cut the meat into strips, there is less tendency for the slab of meat to wrap, although such wrapping can occur in the Huse mechanism if the guide fingers are not present and functioning.

As discussed in the foregoing, most of the prior art devices are directed to meat tenderizing, i.e., scoring the meat, and not to meat slicing. Even the Deckerr arrangement, which does slice the meat, simultaneously scores the meat into the cutting area as the tenderizing blades pull the meat therethrough. In all such cases, the apparatus is designed to process raw meat and none of the prior art references of which applicant is aware is designed to process and slice cooked meat into strips or cubes.

In restaurants which serve, for example, fajitas, or diced meat salads, it is much more efficient and economical to cook the meat before slicing or cubing it. Cooked meat loses most of the glutinous tendencies of raw meat and thus is less likely to cling to the cutting blades or to wrap around the shafts. On the other hand, cooked meat is more susceptible to tearing or ragged cutting. Thus, in an apparatus of the type shown in the Deckerr patent, the toothed tenderizing wheels, if used with cooked meat, would tend to tear the meat, resulting in unsightly strips or cubes. Even arrangements such as in the Huse apparatus, which apparently does not use toothed tenderizing wheels to tenderize the meat, tend to make ragged shallow cuts in the meat.

It is therefore, an object of the present invention to cut food, such as meat, into neat, clean-cut strips or cubes, whether the food is raw or cooked.

SUMMARY OF THE INVENTION

The present invention, in an illustrative embodiment thereof, comprises a meat slicing apparatus, as opposed to a meat tenderizing apparatus, which is especially adapted to produce cleanly cut strips or cubes of either cooked or raw meat.

The preferred embodiment of the invention comprises a frame member which has first and second parallel shafts journaled therein. Each shaft has arrayed thereon a plurality of cutting discs which are maintained in spaced relationship to each other by spacers on the shaft. The dimensions and orientation of the spacers are such that the cutting discs on the two shafts are interleaved and overlapped to form pairs of closely adjacent cutters, with the spacing between adjacent pairs approximating the desired width of the cut meat strips.

The shafts are geared together to be contra rotating, with the gears being designed to produce a greater speed of rotation for one set of cutting discs relative to the speed of rotation of the other set of discs. With this arrangement, the faster rotating disc performs a slicing action relative to the slower rotating disc, which helps to insure a cleaner cut. One of the shafts is rotated by means of a crank handle, thereby, through the gearing, rotating the other shaft.

Mounted on top of the frame are first and second guide members for centering the meat to be cut and guiding it into the cutting area between the two shafts. The lower extensions of the guide members are elongated fingers so spaced that adjacent fingers straddle each pair of cutter blades and the fingers themselves extend into and through the space between adjacent pairs of cutter blades or discs. The fingers function to guide the meat to be cut through the cutting area and to prevent any wrapping or jamming of the meat, whether cooked or raw.

It has been found that the amount of overlap of two adjacent blades, one on each shaft, which are in close proximity, is crucial to the realization of a truly clean cut in the meat. If the amount of overlap is insufficient, the cuts, especially for cooked meat but also for raw meat, will tend to be ragged. It has been found that if two adjacent cutting discs forming a pair are overlapped a distance equal to or greater than one-half of the thickness of the meat being cut, the cut will be clean and linear, resulting in uniform strips. In like manner, insertion of such a strip back into the cutting area and extending along the length thereof will result in cleanly cut, uniformly shaped and sized cubes, with no unsightly raggedness. It has likewise been found that such a relationship between cutter disc overlap and meat thickness applies regardless of the type of meat, e.g., beef or chicken, and whether the meat is cooked or raw. As a consequence, the cutter discs on one shaft of the illustrative embodiment overlap their adjacent cutter discs on the other shaft by an amount equal to or greater than the maximum thickness of the meat to be cut, as defined by the minimum distance that the guide members and their fingers are spaced from each other. Also, in order to achieve a clean cut, adjacent cutter discs forming a pair are spaced as closely together as is feasible while allowing sufficient spacing to prevent the discs from touching during operation in the event one or both of them is not perfectly flat. In general, a degree of planarity of the discs, which are approximately one-thirty-second (1/32) of an inch thick, can be achieved to permit the spacing to be in the range of one-thirty-second (1/32) of an inch to one sixteenth (1/16) of an inch. When the discs are thus spaced, they produce, as a result of the inherent elasticity of the meat, a single clean cut, both for cooked meat and raw meat.

The apparatus of the invention is of modular construction so that the entire apparatus may be quickly disassembled for cleaning and/or storage. Reassembly is simple and can be quickly done. In addition, with such a modular construction, replacement of the cutting blades, or substitution of differently sized blades for processing different thicknesses of meat, is readily accomplished. In a like manner, the maximum thickness of the meat that the apparatus is capable of handling can be varied by changing the guides and finger spacings.

The various objects and features of the present invention can more readily be understood and appreciated from the following detailed description, read in conjunction with the accompanying drawings.

DETAILED DESCRIPTION

Figure 1:
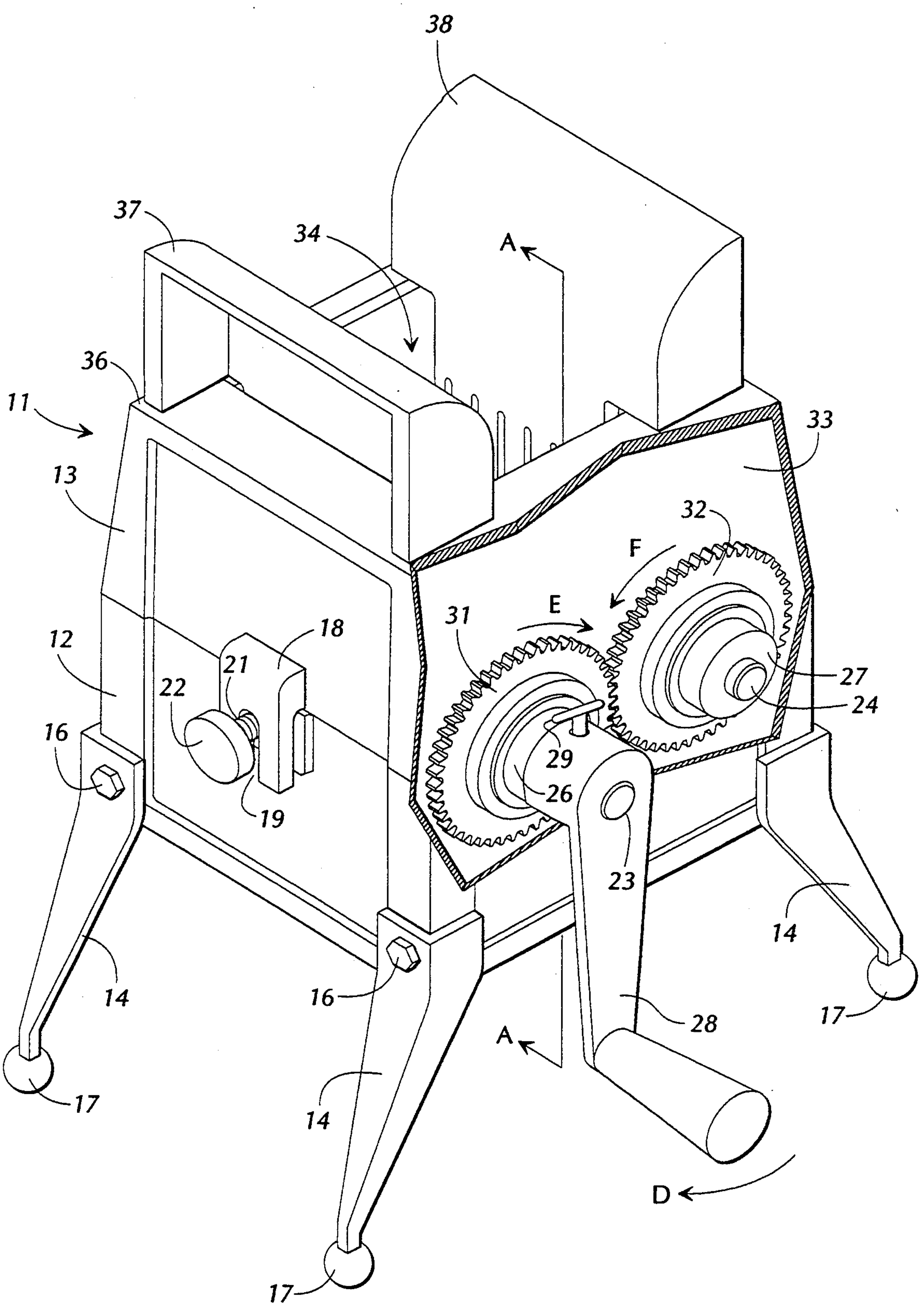
FIG. 1 is a perspective, partially cutaway view of the apparatus of a preferred embodiment of the invention.

In FIG. 1 there is shown an illustrative embodiment of the invention which comprises a meat slicing apparatus 11 having a lower frame member 12 and an upper frame member 13. Lower frame member 12 has four support legs 14,14 affixed thereto as by bolts 16,16, the distal ends of the legs being capped by rubber feet 17,17 or by suction cups, if desired. Top frame member 13 is detachably affixed to lower frame member 12 by a pair of brackets 18,18 only one of which is shown, each having a U-shaped slot 19 through which a bolt 21, threaded to lower frame member 12, passes. A knob 22, threaded on bolt 21, is finger tightened to bear against bracket 18 to affix top member 13 to lower member 12. The upper and lower frame member 12,13 and the legs 14 are preferable made of heavy gauge aluminum, although other suitable materials, such as stainless steel, may also be used.

As will be discussed more fully hereinafter, a pair of parallel shafts 23 and 24 extend through the hollow assembly formed by frame members 12 and 13, and are journaled therein by bushings 26 and 27, respectively, which may be of suitable material such as nylon. Shaft 23 has an extended portion to which is affixed a crank handle 28 to permit manual rotation of the shaft 23. Handle 28 may be affixed to shaft 23 by means of a butterfly headed set screw 29. Mounted on shaft 23 adjacent one end of the assembled frame member 12 and 13, and enclosed thereby, is a planer spur gear 31, and amounted on shaft 24 is a second planar spur gear 32 which meshes with gear 31. Thus, when handle 28 is rotated in the direction of the arrow D, gear 31 rotates in the direction of the arrow E, driving gear 32 in the direction of arrow F. In this manner, shafts 23 and 24 are made to be contra-rotating. In addition, gear 31 has a greater diameter than gear 32, thus causing shaft 24 to rotate at a greater speed of rotation than shaft 23. Frame member 13 has an interior transverse wall 33 which isolates the gears 31 and 32 from the remainder of the enclosed volume which includes the meat cutting region. Such isolation insures that any minute metal shavings, where gears 31 and 32 are made of metal, or plastic shavings, where they are of plastic, will not intrude into the meat cutting region.

Figure 2:
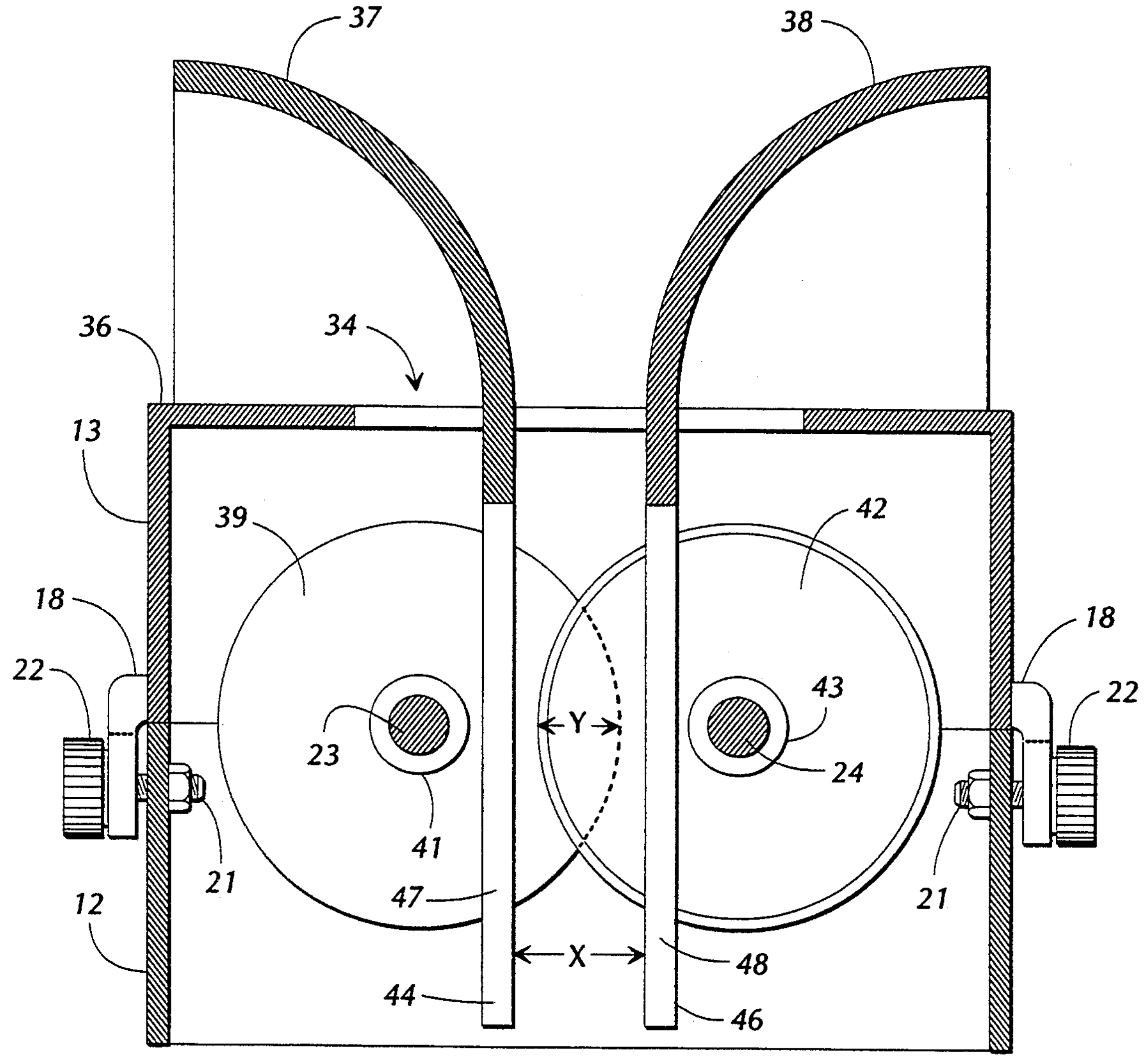
FIG. 2 is a side elevation sectional view along the line A—A of FIG. 1.
Figure 4:
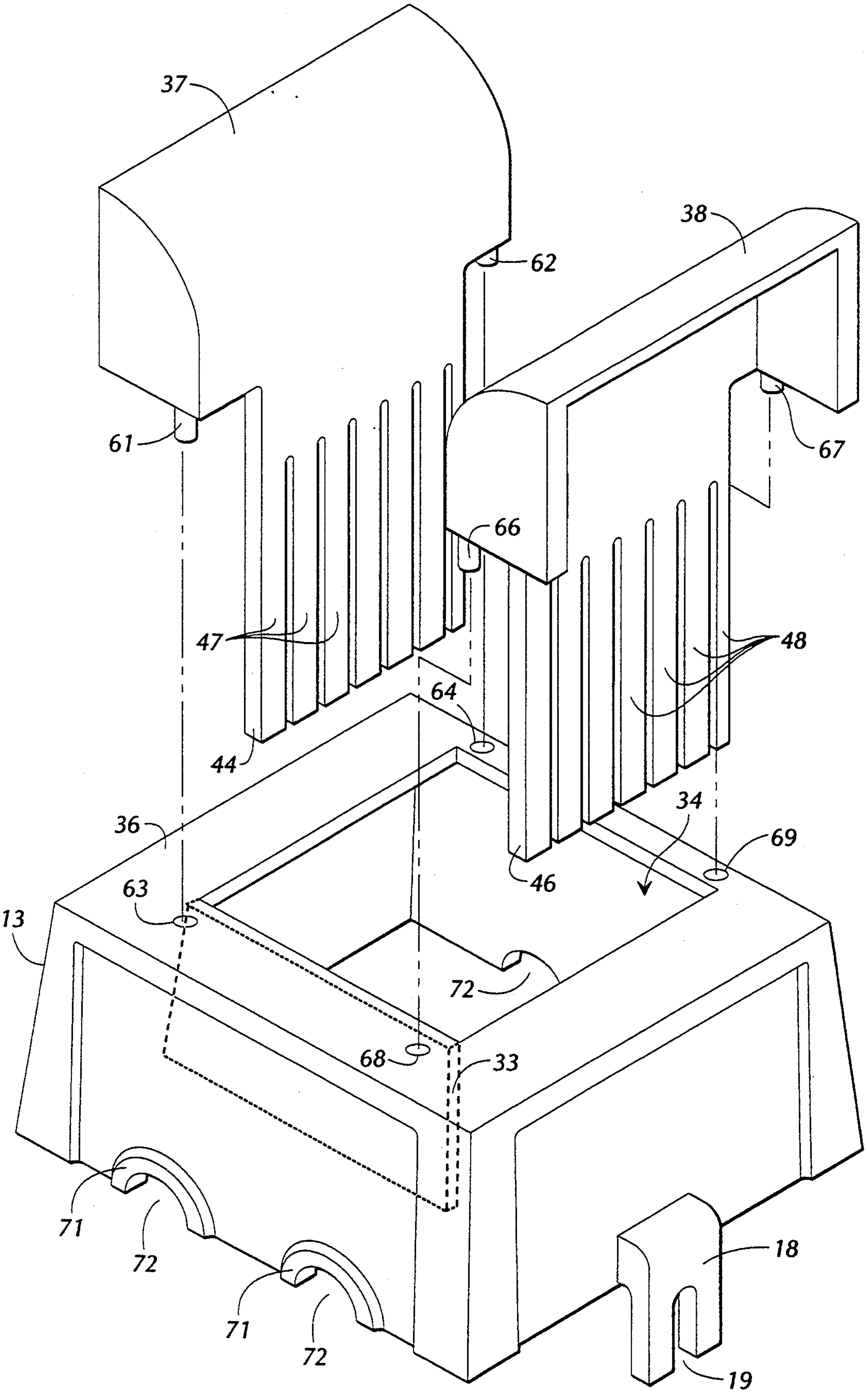
FIG. 4 is a perspective, exploded view of the top portion of the apparatus of FIG. 1

As shown more clearly in FIGS. 2 and 4, member 13 has an opening 34 in the top surface 36 thereof providing access to the cutting region. Located on the top surface 36 of member 13 are first and second removable guiding members 37 and 38, the structure of which will be discussed hereinafter in connection with the remaining figures. Guide members 37 and 38 have depending portions terminating in fingers 47,47 and 48,48 which extend down into and through the cutting region, as best seen in FIG. 2, and which serve to guide the meat to be cut into the cutting region, as will be explained hereinafter.

Figure 3:
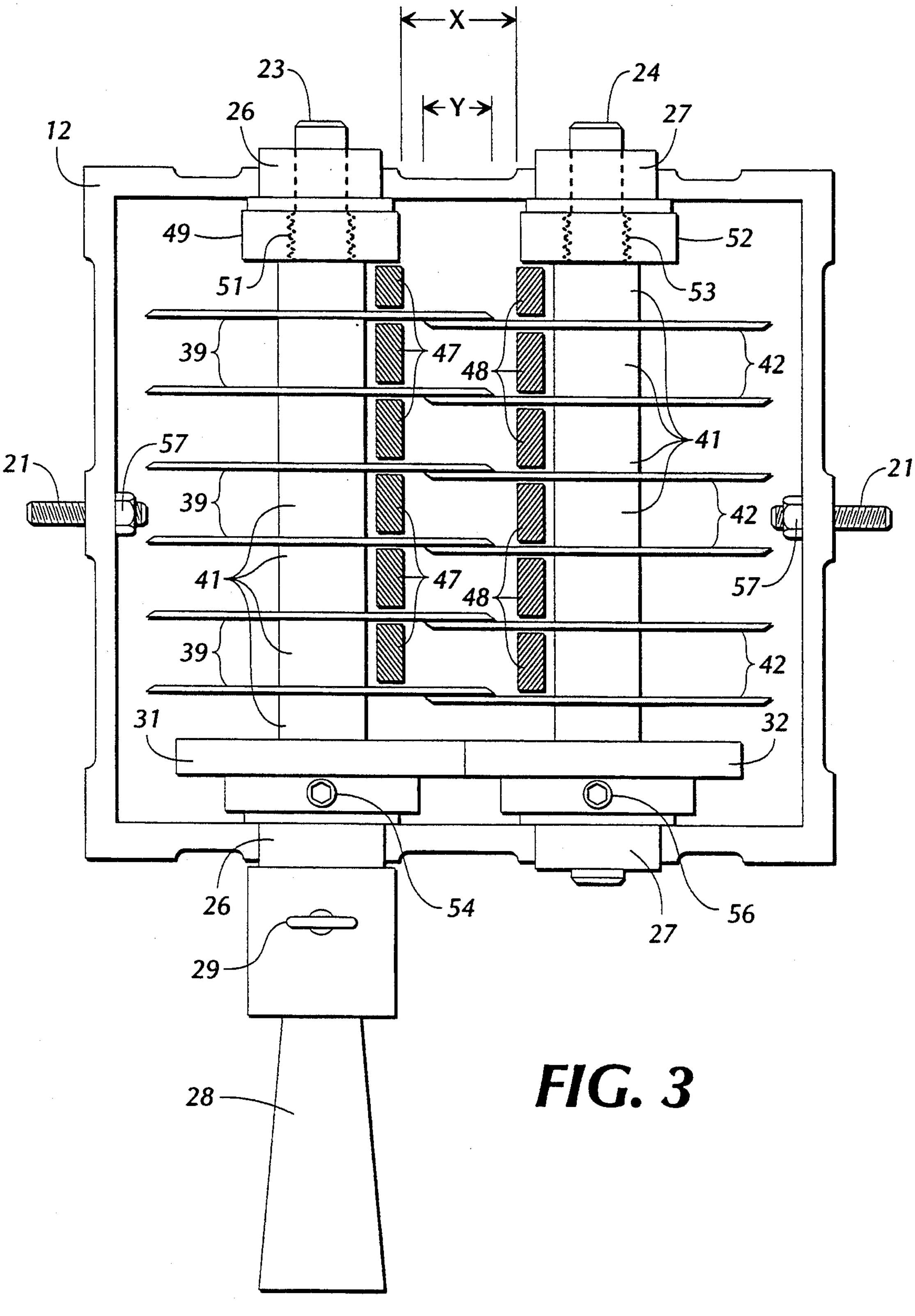
FIG. 3 is a plan view of the apparatus of FIG. 1 with the top portion removed, and showing the fingers in cross-section.

In FIG. 2, there is shown a cross-sectional elevation view of the cutting region. Shaft 23 has arrayed thereon a plurality of disc cutters 39,39 maintained in fixed spaced relationship by a plurality of spacers 41,41. Cutter 39 and spacers 41 are bored to be slip fits on shaft 23. In like manner, shaft 34 has arrayed thereon a plurality of disc cutters 42,42, maintained in spaced relationship by spacers 43,43. Cutters 39 and. 42 are each of such a diameter that, when mounted on the parallel shafts 23 and 24, they overlap each other a distance Y, as shown. As seen in FIG. 2, guide members 37 and 38 have lower portions 44 and 46 respectively which extend through the cutting region as defined by cutting discs 39 and 41 in the form of fingers 47,47 and 48,48, which, as best seen in FIG. 3, straddle the cutter discs 39 and 42. The spacing between the fingers 47 and 48, designated as dimension X, determines the maximum thickness of meat or other food that may pass through the cutting region and out the open bottom of member 12. FIGS. 1 and 2 show shafts 23 and 24 spaced a fixed distance apart in bushings 26 and 27 respectively. As will be apparent hereinafter, each of bushings 26 and 27 rides in a bore formed when member 12 and 13 are fitted together. The structure of FIGS. 1 and 2 can be altered to have a plurality of such bores so that the separation of parallel shafts 23 and 24 can be varied, larger or smaller cutting discs used, and the dimension X increased or decreased in order to accommodate larger or smaller slices of meat to be cut. It has been found that where the dimension Y is something less than one-half the dimension X($Y<X/2$) a ragged cut is produced with either cooked meat or raw meat. In addition, where only cutting discs are used, as in the present invention, instead of at least one toothed wheel, the blades do not always exert a uniform pull on the meat to pull it through the cutting region. Thus, in the embodiment of the figures, and in accordance with a feature of the invention, the overlap dimension Y is equal to or greater than one half the dimension X(Y≧X/2). When this relationship obtains, the meat is uniformly and positively drawn through the cutting area, and is cleanly sliced to form neat, non-ragged strips or cubes, either cooked or uncooked. Where the dimension X is varied by relocating member 37 and 38, different diameter discs, or differently spaced shafts 23 and 24 must be used to maintain the relationship Y≧X/2.

FIG. 3 illustrates the positioning of the cutter discs 39,39 and 42,42 on the shafts 23 and 24 respectively, and their positional relationship to each other. The discs 39, whose cutting edges are shown beveled on one side only, but which may be beveled on both sides, are arranged in spaced relationship on shaft 23 by means of a plurality of spacers 41, as shown. The array of discs 39 and spacers 41 which is slipped onto shaft 23, is held in fixed relationship and secured by a locking nut 49, which is threaded onto a threaded portion 51 of shaft 23, as shown in dashed lines. In like manner, disc 42 and spacers 43 are secured on shaft 24 by means of locking nut 52 threaded onto threaded portion 53 of shaft 24. It is to be understood that other means of securing the cutter disc arrays on their respective shafts might be used, the arrangement shown in FIG. 3 being preferred, however, for its simplicity and ease of disassembly.

The dimensions of the spacers 41 and 43 are such that each pair of adjacent discs 39 and 42 each of which is approximately 1/32 inches thick, are separated from each other by a distance ranging from 1/32 inches to 1/16 inches. In other words, they are separated by a distance ranging from the thickness of a disc to twice the thickness of a disc. The distance between adjacent discs on the same shaft, i.e., the length of the spacers is considerably greater than the separation of adjacent discs on separate shafts, i.e., disc pairs, thus allowing fingers 47,47 and 48,48 to pass down between the discs, as shown. This distance between adjacent discs on the same shaft determines the width of the strip of meat produced, and can be varied by using different spacer lengths. Ideally, adjacent discs on different shafts (disc pairs) would be even closer together than 1/32 inch. However, it is quite difficult to produce absolutely flat cutter discs, hence the illustrated spacing is necessary to insure that the discs do not rub against search other and thereby create minute metal shavings in the cutting region.

It can also be seen in FIG. 3 that gears 31 and 32, which may be of either plastic or metal, are affixed to their respective shafts by means of set screws 54 and 56. Also bolts 21,21 are affixed in place by lock nuts 57,57.

In FIG. 4, the upper frame member 13 is shown in perspective along with guide members 37 and 38 and their depending fingers 47,47 and 48,48 respectively. Guide member 37 has first and second locating pins 61 and 62 projecting from the underside thereof, which are adapted to fit within locating holes 63 and 64 bored in top surface 36 of member 13. In like manner, guide member 38 has locating pins 66 and 67 adapted to fit within locating holes 69 and 69 bored in surface 36. Such an arrangement of locating pins and holes functions to locate guide means 37 and 38 accurately with respect to the cutting disc arrays formed by the individual discs 39,39 and 42,42 and their respective spacers. Where differing thicknesses of meat to be cut are used, a plurality of holes 63,64 and 68,69 may be drilled in surface 36 so that guide members 37 and 38 may be spaced closer together or farther apart. Inasmuch as any load on the guides 37 and 39 is substantially vertical, i.e., downward toward the cutting area defined by the disc arrays, thereby forcing guide members 37 an 38 against surface 36, no other means is necessary for holding them in place. On the other hand, the pin and hole arrangement permits quick disc-assembly for cleaning or storing. As seen in FIG. 4, member 13 has a pair of bosses 71 on each side, only one pair being shown, which have a half bore 72 extending therethrough. When member 13 is placed atop member 12, bores 72,72 mate with corresponding half bores, not shown, in member 12 to define circular bores for receiving bushings 26 and 27, which are slip fits therein.

From the forgoing description of a preferred embodiment incorporating the features of the invention, it can be seen that, in operation, the apparatus cuts food, especially meat, into neat, clean-cut strips or cubes, regardless of whether the food is raw or cooked.

The forgoing description of an embodiment of the invention has been for purposes of illustrating the principles thereof. Numerous modifications, alternations, or variations may occur to workers skilled in the art without departure from the spirit and scope of the invention.

We claim:

1. A food slicing machine comprising, a first frame member having side walls and a second frame member having side walls adapted to be superposed on said first frame member, said second frame member having a top surface and an aperture therein;

said first and second frame members together defining a plurality of apertures in the side walls thereof;

first and second parallel shafts mounted in said apertures and extending between opposed side walls;

an array of a plurality of first spaced cutting discs mounted on said first shaft;

first means for maintaining said first discs in a first spaced relationship;

a second array of a plurality of second spaced cutting discs mounted on said second shaft;

second means for maintaining said second discs in a second spaced relationship;

said first and second arrays defining a cutting region;

each of said second discs on said second shaft being offset from a corresponding first disc on said first shaft a distance of from the thickness of a disc to twice the thickness of a disc and forming a disc pair with said corresponding first disc for forming a single cut by said pair in the food being sliced, each of said disc pairs thus formed being spaced from adjacent disc pairs a distance substantially greater than the distance between the discs forming a pair and substantially equal to the desired thickness of the slices to be cut in the food;

first and second food guide means extending substantially normal to the axes of said first and second shafts and extending into the spaced between disc pairs, said first guide means being spaced from said second guide means a distance defining the maximum allowable thickness of food to be cut;

the diameter of each of the discs in a disc pair and the spacing of said first and second shafts being such that the discs in each disc pair overlap a distance equal to or greater than one-half the spacing between said first and second guide means;

means for altering the spacing between said first and second guide means; and means for rotating said first and second shafts to cut the food.

2. A food slicing machine as claimed in claim 1 wherein said means for rotating comprises means for rotating said first shaft in counter relationship to the rotation of said second shaft.

3. A food slicing machine as claimed in claim 1 wherein said means for rotating comprises means for rotating said first shaft at a different speed of rotation than said second shaft.

4. A food slicing machine as claimed in claim 1 and further comprising bushing means through which said first and second shafts extend mounted in each of said plurality of apertures.

5. A food slicing machine as claimed in claim 1 wherein each of said first and second guide means is mounted on said top surface and comprises a plurality of fingers extending through said cutting region, each pair of adjacent fingers straddling a cutter pair.

6. A food slicing machine for slicing food into strips comprising a frame;

first and second spaced parallel shafts mounted in said frame;

means for rotating said first and second shafts;

an array of spaced cutter blades mounted on said first shaft;

an array of spaced cutter blades mounted on said second shaft forming a cutting region with the blades on said first shaft, each cutter blade on said first shaft being closely adjacent to a corresponding cutter blade on said second shaft to form an overlapped cutter pair for making a single cut in the food;

adjacent cutter pairs being spaced from each other a distance substantially greater than the distance between the discs forming a cutter pair and equal to the desired thickness of the food strip to be produced;

first and second spaced guide means extending from above said frame to the cutting region and between adjacent cutter pairs for defining the maximum allowable thickness of food to be cut;

the cutter blades forming each overlapped cutter pair being overlapped a distance equal to or greater than one half other spacing between said first and second guide means within the cutting region.

7. A food slicing machine as claimed in claim 6 wherein said means for rotating said first and second shafts comprises a gear member mounted on each shaft adapted to mesh with the gear mounted on the other shaft, and a handle for rotating one of said shafts.

8. A food slicing machine as claimed in claim 7 wherein one of said gear members is of larger diameter than the other gear member.

9. A food slicing machine as claimed in claim 6 wherein said arrays of cutter blades define a cutting region interiorly of said frame, and interior means on said frame for separating said cutting region from said means for rotating said shafts.

10. A food slicing machine as claimed in claim 6 wherein said first and second guide means each comprises a plurality of fingers.

11. A food slicing machine as claimed in claim 10 wherein adjacent fingers straddle a cutter blade.

12. A food slicing machine as claimed in claim 10 wherein each of said fingers substantially fills the space between adjacent cutter blades mounted on the same shaft.

13. A food slicing machine as claimed in claim 6 wherein the spacing between adjacent cutter blades forming a cutter pair is from a cutter blade thickness to twice a cutter blade thickness.

* * * * *